(12) United States Patent
Leopold

(10) Patent No.: US 8,231,169 B2
(45) Date of Patent: Jul. 31, 2012

(54) ROCKER PANEL FOR A MOTOR VEHICLE

(75) Inventor: Frank Leopold, Taunusstein-Orlen (DE)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 12/377,665

(22) PCT Filed: Jul. 26, 2007

(86) PCT No.: PCT/EP2007/057733
§ 371 (c)(1),
(2), (4) Date: Dec. 17, 2010

(87) PCT Pub. No.: WO2008/019933
PCT Pub. Date: Feb. 21, 2008

(65) Prior Publication Data
US 2011/0089722 A1    Apr. 21, 2011

(30) Foreign Application Priority Data

Aug. 16, 2006 (DE) .......................... 10 2006 038 256

(51) Int. Cl.
*B62D 25/02* (2006.01)
*B62D 25/22* (2006.01)
(52) U.S. Cl. ....................... 296/209; 280/164.1; 362/495
(58) Field of Classification Search .................. 296/199, 296/209, 1.07, 1.08; 280/163, 164.1, 166; 362/495
See application file for complete search history.

(56) References Cited

U.S. PATENT DOCUMENTS

| 5,129,678 | A  |   | 7/1992  | Gurbacki |         |
|-----------|----|---|---------|----------|---------|
| 7,017,927 | B2 | * | 3/2006  | Henderson et al. | 280/166 |
| 7,445,221 | B2 | * | 11/2008 | Kobayashi | 280/166 |
| 7,621,546 | B2 | * | 11/2009 | Ross et al. | 280/166 |
| 2010/0059962 | A1 | * | 3/2010 | Leitner et al. | 280/166 |

FOREIGN PATENT DOCUMENTS

| DE | 2800229 A1  | 7/1979 |
| DE | 19747171 A1 | 4/1999 |
| DE | 19933508 A1 | 1/2001 |
| DE | 10151931 A1 | 5/2003 |
| DE | 10242434 A1 | 3/2004 |
| EP | 1568529 A1  | 8/2005 |
| WO | 9726176 A1  | 7/1997 |

OTHER PUBLICATIONS

International Searching Authority, International Search Report for Application No. PCT/EP2007/057733, dated Nov. 7, 2007.
German Patent Office, German Search Report dated Aug. 16, 2006 for German Application No. 102006038256.0.

* cited by examiner

*Primary Examiner* — Jason S Morrow
(74) *Attorney, Agent, or Firm* — Ingrassia Fisher & Lorenz, P.C.

(57) ABSTRACT

A rocker panel is provided for a motor vehicle, having a first oblong rocker panel part, on which a second oblong rocker panel part, having longitudinal axis (A) parallel thereto, is fastened so it is movable in relation thereto.

18 Claims, 2 Drawing Sheets

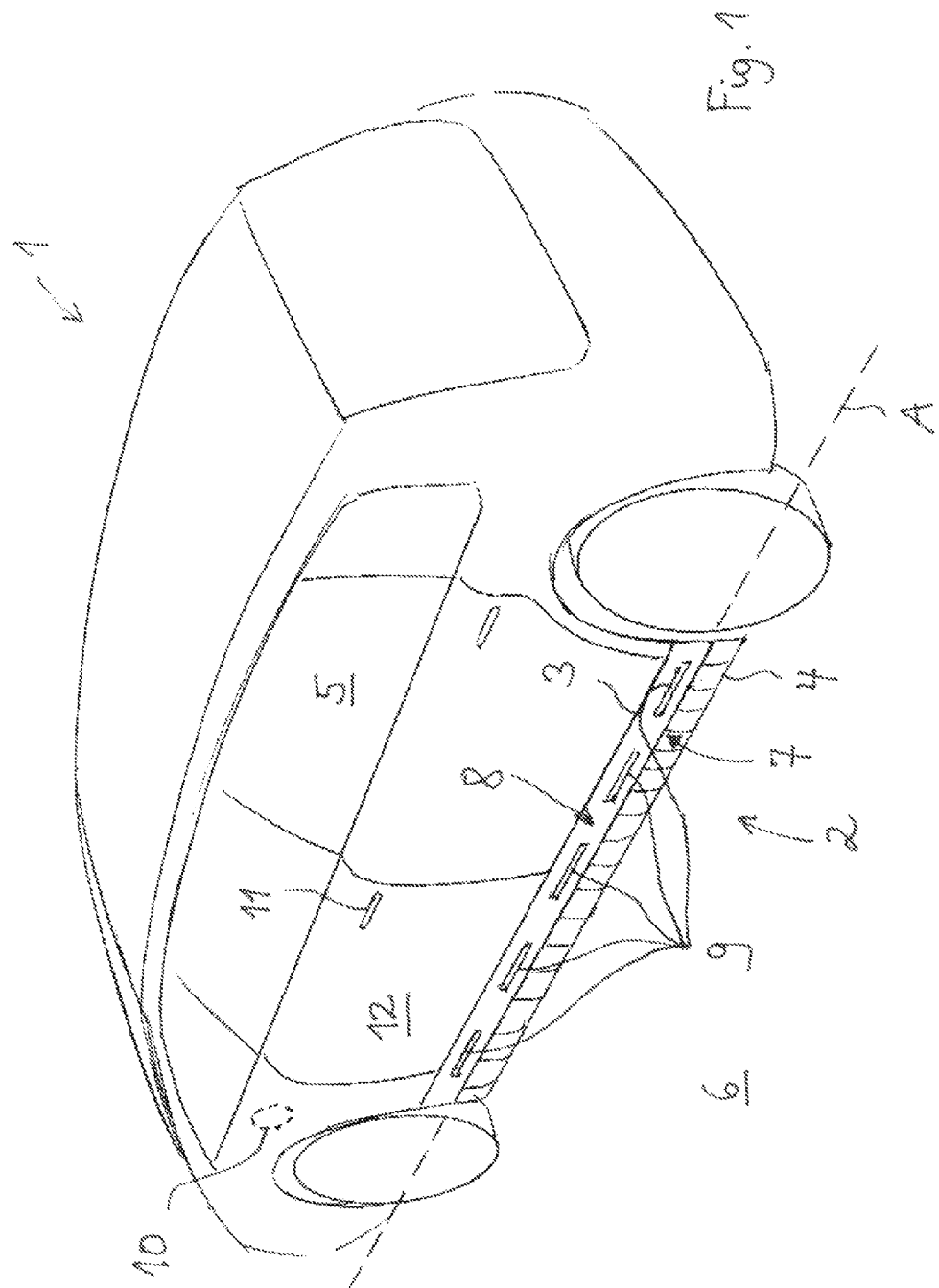

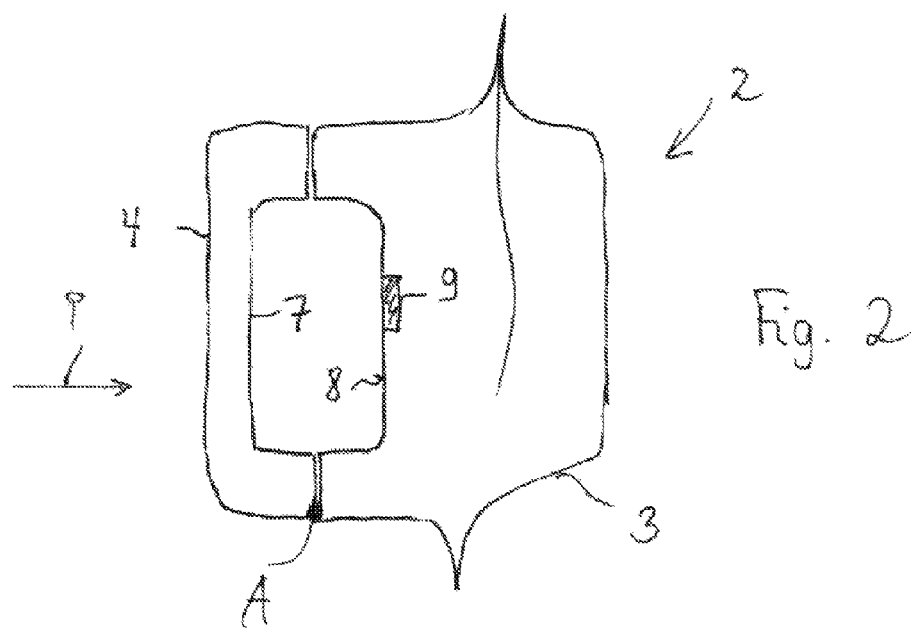
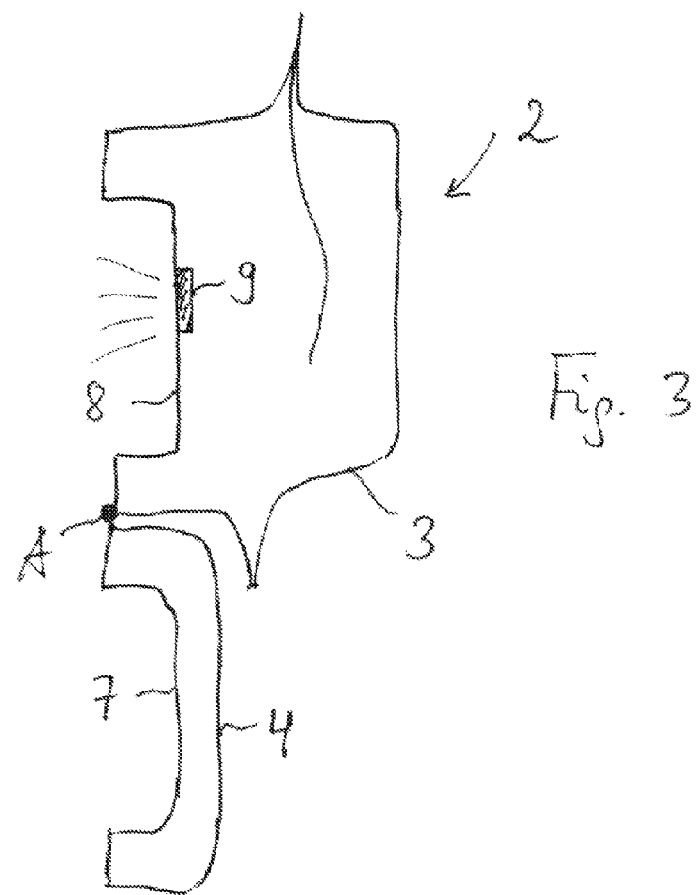

ROCKER PANEL FOR A MOTOR VEHICLE

CROSS-REFERENCE TO RELATED APPLICATIONS

This application is a U.S. National-Stage entry under 35 U.S.C. §371 claims priority to International Application No. PCT/EP2007/057733, filed Jul. 26, 2007, which was published under PCT Article 21(2), and claims priority to German Application No. 102006038256.0, filed Aug. 16, 2006, which are all hereby incorporated in their entirety by reference.

TECHNICAL FIELD

The invention relates to a rocker panel for a motor vehicle, for example, for a passenger automobile.

BACKGROUND

When entering or exiting a motor vehicle, one often touches the rocker panel, also referred to as the side rocker panel. This area of the vehicle is often dirty or also wet, however, so that the leg apparel may accordingly be affected.

It is at least one object of one embodiment of the invention to provide a rocker panel and an associated motor vehicle, which allow entry or exit without the leg apparel becoming dirty or wet due to the rocker panel. In addition, other objects, desirable features, and characteristics will become apparent from the subsequent summary and detailed description, and the appended claims, taken in conjunction with the accompanying drawings and this background.

SUMMARY

A first aspect of the invention relates to a rocker panel of a motor vehicle, which is mountable as usual on the two longitudinal sides of the motor vehicle. The rocker panel has a first oblong rocker panel part, on which a second oblong rocker panel part having longitudinal axis parallel thereto is fastened so it is movable in relation thereto.

In the following embodiments, it is to be assumed that the first rocker panel part is attached fixed on the vehicle body floor structure and is welded thereto, for example. The second rocker panel part is thus movable in relation to the vehicle body.

Two rocker panel parts may be produced from sheet metal having reduced drawing depth by the two-part implementation of the rocker panel. This makes the deep-drawing process technically simpler and more cost-effective.

Due to the relative mobility of the second rocker panel part, the distance, measured in the vehicle transverse direction, between the driver's seat center and the outside edge of the rocker panel may be reduced, for example. This makes it easier to enter and exit the motor vehicle without touching the rocker panel.

Due to the movable implementation of the second rocker panel part, it may be transferred from a first operating position into a least one further operating position. A first operating position may be selected for the driving operation and a second operating position may be selected for the entry and exit. This has the result in the design that different faces of the rocker panel point toward the vehicle external side in the two operating positions. In the operating position which is selected for driving operation, the associated face, referred to as the first face hereafter, may become dirty. In the operating position which is selected for the procedures of entry and exit, the associated face, referred to as the second face hereafter, typically remains clean. The movable embodiment offers the capability of situating the second face in such a way that it is concealed during the driving operation and thus remains clean. Entry and exit are thus possible for the user, in that he always comes to the clean second face of the rocker panel. The leg apparel also neither becomes dirty nor wet due to the rocker panel in this way.

Although the above statements referred to the driver's seat, it is obvious that they also apply to the further outside seats, such as the passenger seat or the outside seats in the second or third row of seats.

In a second embodiment, the first rocker panel part faces toward the vehicle interior and the second rocker panel part is situated on the vehicle external side. The spacing between the driver seat center and the outside edge of the rocker panel may thus be decreased by approximately the depth of the second rocker panel part, measured in the vehicle transverse direction.

The fastening of the second rocker panel part on the first rocker panel part may be performed in multiple ways. In a third embodiment, for example, it is provided that the second rocker panel part is linked to the first rocker panel part. The second rocker panel part may thus be pivoted away from the first rocker panel part, the pivot axis running parallel to the longitudinal direction of the vehicle.

It is suggested as a fastening possibility in a further embodiment that a slide guide mounted on the first rocker panel part is provided on the second rocker panel part. The movement of the second rocker panel part thus occurs linearly and, for example, linearly downward.

A further variant of the rocker panel has a second rocker panel part made of plastic. Only the first rocker panel part thus still comprises a deep-drawn sheet-metal, which may be selected as a rolled profile, for example. This selection reduces the total weight of the rocker panel.

A further embodiment of the present invention furthermore provides that the second rocker panel part is fastened on the first rocker panel part so it is dismountable. Specifically, if the second rocker panel part is situated externally, it may be damaged by rock impact and replaced because of the dismountable embodiment.

Further embodiments provide that an actuating mechanism is assigned to the rocker panel to move the second rocker panel part in relation to the first rocker panel part. The actuating mechanism may be of an electrical, electromagnetic, or hydraulic nature.

Furthermore, an embodiment is suggested in which the first rocker panel part has illumination means. The floor area of the motor vehicle in the area of the rocker panel may thus be illuminated and produce an entry and exit in which mud or wet spots on the floor are not touched.

The configuration of the illumination means may be selected according to a further embodiment in such a way that the second rocker panel part is transferable from a first operating position, in which the illumination means are not externally visible, into a second operating position, in which the illumination means are externally visible. The first operating position is selected for the driving operation and a second operating position for the entry and exit.

A second aspect of the invention relates to a motor vehicle having a rocker panel as described above. In one embodiment of the motor vehicle, such as a passenger automobile, the actuating mechanism and/or the illumination means may be activated via the door lock of a vehicle door, such as the driver's door. When the door is closed, the rocker panel and/or its second rocker panel part are in a first operating position, in which a possibly dirty first face is facing toward the vehicle exterior side.

BRIEF DESCRIPTION OF THE DRAWINGS

The embodiments of the present invention will hereinafter be described in conjunction with the following drawing figures, wherein like numerals denote like elements, and:

FIG. 1 shows a motor vehicle in a perspective side view having a two-part rocker panel;

FIG. 2 schematically shows a rocker panel in a first operating position; and

FIG. 3 schematically shows a rocker panel in a second operating position.

DETAILED DESCRIPTION

The following detailed description is merely exemplary in nature and is not intended to limit application and uses. Furthermore, there is no intention to be bound by any theory presented in the preceding background or summary or the following detailed description.

FIG. 1 shows a motor vehicle 1 having a rocker panel 2. The rocker panel 2 is located on the left and right on the vehicle longitudinal side as usual. It comprises a first oblong rocker panel part 3 and a second oblong rocker panel part 4 having longitudinal axes which are parallel to the axis A, which runs in the vehicle longitudinal direction. The first rocker panel part 3 is welded to the floor structure and the second rocker panel part 4 is implemented as movable in relation thereto.

In the embodiment of FIG. 1, A identifies the pivot axis around which the second rocker panel part 4 may be pivoted in relation to the first rocker panel part 3, which is fixed on the vehicle body. FIG. 1 shows the second rocker panel part 4 in the pivoted-down and/or folded-down position. This operating position is used for the entry and exit. It is characterized in that the inner face 7 of the second rocker panel part 4 and the face 8 of the first rocker panel part 3 always remain clean. The reason is that in driving operation, these two faces 7 and 8 face toward one another and are protected to the outside. If one enters or exits the motor vehicle, one at most touches a clean face 7 or 8 and therefore, for example, cannot get one's trouser leg dirty or wet.

In a further operating position (not shown), which is selected for driving operation, the second rocker panel part 4 is in its starting position (i.e., in its position which is not folded down). In this case, the second rocker panel part 4 faces toward the vehicle exterior side 6 and the first rocker panel part 3 faces toward the vehicle interior 5. The rear of the upper or second rocker panel part 4 (not shown in FIG. 1) may become dirty in driving operation, which does not play a role for the entry and exit, however.

The second rocker panel part 4 is fastened on the first rocker panel part 3 so it is dismountable. If the second rocker panel part 4 is damaged because of rock impact, it may be easily replaced. In one embodiment, a slide guide mounted on the first rocker panel part 3 is provided on the second rocker panel part 4. The movement of the second rocker panel part 4 thus occurs linearly and, for example, linearly downward.

FIG. 2 and FIG. 3 show the rocker panel 2 of FIG. 1 looking in the vehicle longitudinal direction and/or in the direction of the axis A. FIG. 2 shows a first operating position for the driving operation and FIG. 3 shows a second operating position for the entry and exit.

It may be inferred from FIG. 2 that the faces 7 and 8 are protected from soiling in driving operation, so that they may not soil the leg apparel in the operating position of FIG. 3, which is selected for the entry and exit.

The second rocker panel part 4 may be manufactured from plastic, so that it forms a rocker panel casing. The total drawing depth of the rocker panel 2 to be measured in the direction of the arrow P is thus reduced, because only the first rocker panel part 3 comprising sheet metal has to be deep drawn. This makes the deep-drawing technically simpler and more cost-effective.

The clean (inner) face 8 of the first rocker panel part 3 may be used to provide at least one illumination means 9 thereon (e.g., a light or LEDs). It illuminates these surroundings only when the second rocker panel part 4 is folded down and helps so that one does not step on muddy or wet ground in the area of the vehicle door. A clean entry and exit of the vehicle 1 are also thus made easier.

An actuating mechanism 10 in the form of an electric motor is provided for folding the second rocker panel part 4 up and down. The actuating mechanism 10 may be of an electrical, electromagnetic, or hydraulic nature. It is activated via the door lock 11. If one opens the driver's door 12, the central lock gives a signal to the actuating mechanism 10, upon which it folds down the second rocker panel part 4 and turns on the illumination means 9. Upon closing of the door of the motor vehicle 1, vice versa, the second rocker panel part 4 is folded up and the illumination means 9 are turned off.

The actuating mechanism may also be activated via the engine ignition. If the motor is started, the second rocker panel part 4 is folded up and the illumination means are turned off.

Although concrete embodiments were described above, one skilled in the art will recognize that the description of this embodiment does not have the purpose of restricting the invention to the specified form. Rather, the invention is to comprise all modifications, equivalents, and alternatives which fall in the protective scope of the claimed invention.

Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A rocker panel for a motor vehicle, comprising:
   a first oblong rocker panel part; and
   a second oblong rocker panel part having a longitudinal axis substantially parallel to the first oblong rocker panel part and on which the first oblong rocker panel part is fastened so as to move in relation thereto, the second oblong rocker panel part being configured to be moved between a first position, in which an inner surface of the second oblong rocker panel part faces toward the first oblong rocker panel part in a first direction that is toward the motor vehicle, and a second position, in which the inner surface of the second oblong rocker panel part faces away from the motor vehicle in a second direction that is opposite to the first direction.

2. The rocker panel according to claim 1, wherein the first oblong rocker panel part faces toward a vehicle interior and the second oblong rocker panel part is situated on a vehicle exterior.

3. The rocker panel according to claim 1, wherein the second oblong rocker panel part is linked on the first oblong rocker panel part.

4. The rocker panel according to claim 1, wherein the second oblong rocker panel part comprises a plastic.

5. The rocker panel according to claim 1, wherein the second oblong rocker panel part is fastened on the first oblong rocker panel part so it is dismountable.

6. The rocker panel part according to claim 1, further comprising an assigned actuating mechanism for moving the second oblong rocker panel part in relation to the first oblong rocker panel part.

7. The rocker panel according to claim 6, wherein the assigned actuating mechanism is an electrical, electromagnetic mechanism.

8. The rocker panel according to claim 1, wherein the first oblong rocker panel part comprises illumination.

9. The rocker panel according to claim 8, wherein the illumination is not externally visible when the second oblong rocker panel part is in the first position, and the illumination is externally visible when the second oblong rocker panel part is in the second position.

10. The rocker panel according to claim 6, wherein the assigned actuating mechanism is an electric motor.

11. The rocker panel according to claim 6, wherein the assigned actuating mechanism is an electromagnetic mechanism.

12. The rocker panel according to claim 6, wherein the assigned actuating mechanism is a hydraulic actuating mechanism.

13. The rocker panel of claim 1, wherein:
the motor vehicle has a door having a lock; and
the second oblong rocker panel part is moved between the first position and the second position by an actuating mechanism that is activated via the lock.

14. The rocker panel of claim 1, wherein:
the motor vehicle has an engine having an ignition; and
the second oblong rocker panel part is moved between the first position and the second position by an actuating mechanism that is activated via the ignition.

15. The rocker panel of claim 1, wherein the first direction and the second direction are approximately one hundred eighty degrees apart from one another.

16. A rocker panel for a motor vehicle, comprising:
a first oblong rocker panel part; and
a second oblong rocker panel part having a longitudinal axis substantially parallel to the first oblong rocker panel part and on which the first oblong rocker panel part is fastened so as to move in relation thereto, the second oblong rocker panel part being configured to be moved between a first position, in which an inner surface of the second oblong rocker panel part faces toward the first oblong rocker panel part, and a second position, in which the inner surface of the second oblong rocker panel part faces away from the motor vehicle, wherein the second oblong rocker panel part folds approximately one hundred eighty degrees when moved between the first position and the second position.

17. A rocker panel for a motor vehicle, comprising:
a first oblong rocker panel part; and
a second oblong rocker panel part having a longitudinal axis substantially parallel to the first oblong rocker panel part and on which the first oblong rocker panel part is fastened so as to move in relation thereto, the second oblong rocker panel part being configured to be moved between a first position, in which an inner surface of the second oblong rocker panel part faces toward the first oblong rocker panel part, and a second position, in which the inner surface of the second oblong rocker panel part faces away from the motor vehicle, wherein the second oblong rocker panel part is substantially parallel to the first oblong rocker panel part when the second oblong rocker panel part is in the first position and when the second oblong rocker panel part is in the second position.

18. The rocker panel of claim 1, wherein the second oblong rocker panel part is configured to be moved by an actuating mechanism:
from the first position to the second position for a first operating mode of the motor vehicle for an individual to enter or exit the motor vehicle; and
from the second position to the first position for a second operating mode of the motor vehicle for an individual to drive the motor vehicle.

\* \* \* \* \*